United States Patent
Garcia (10) Patent No.: US 11,589,711 B2
(45) Date of Patent: Feb. 28, 2023

(54) DRINK MIXER APPARATUS

(71) Applicant: Jose Garcia, San Jose, CA (US)

(72) Inventor: Jose Garcia, San Jose, CA (US)

(*) Notice: Subject to any disclaimer, the term of this patent is extended or adjusted under 35 U.S.C. 154(b) by 159 days.

(21) Appl. No.: 17/123,958

(22) Filed: Dec. 16, 2020

(65) Prior Publication Data

US 2022/0183504 A1 Jun. 16, 2022

(51) Int. Cl.
*A47J 43/044* (2006.01)
*A47J 43/27* (2006.01)
*A47J 43/08* (2006.01)
*B01F 33/501* (2022.01)
*B01F 35/10* (2022.01)
*B01F 35/32* (2022.01)
*B01F 101/14* (2022.01)

(52) U.S. Cl.
CPC .......... *A47J 43/044* (2013.01); *A47J 43/082* (2013.01); *A47J 43/27* (2013.01); *B01F 33/5011* (2022.01); *B01F 35/146* (2022.01); *B01F 35/1452* (2022.01); *B01F 35/32025* (2022.01); *A47J 2043/04418* (2013.01); *B01F 2101/14* (2022.01)

(58) Field of Classification Search
CPC .......... A47J 43/044; A47J 2043/04418; B01F 33/5011; B01F 35/32025; B01F 35/514; B01F 35/186
USPC ........................................ 366/129
See application file for complete search history.

(56) References Cited

U.S. PATENT DOCUMENTS

| | | | |
|---|---|---|---|
| 2,042,176 A | 5/1936 | Hausman | |
| 2,932,494 A * | 4/1960 | Wales | A47J 43/044 416/247 R |
| 3,656,718 A * | 4/1972 | Cairelli | A47J 43/044 366/300 |
| 4,155,656 A | 5/1979 | Kramer | |
| 4,497,580 A | 2/1985 | Doyel | |
| 5,586,676 A | 12/1996 | Lynd | |
| 6,224,253 B1 | 5/2001 | Dixon | |
| 7,946,752 B2 | 5/2011 | Swartz | |
| D808,216 S | 1/2018 | Holowaychuk | |
| 10,689,171 B1 * | 6/2020 | Potash | B01F 27/13 |
| 2005/0174882 A1 | 8/2005 | Krasne | |
| 2007/0297281 A1 | 12/2007 | Saunders | |
| 2008/0247267 A1 * | 10/2008 | Clawson | B08B 7/02 366/347 |
| 2009/0135668 A1 * | 5/2009 | Hamilton | B01F 33/5011 366/343 |
| 2010/0143558 A1 * | 6/2010 | Aharonovitch | A23N 1/003 426/489 |
| 2020/0179886 A1 * | 6/2020 | Atinaja | A47J 43/087 |

* cited by examiner

*Primary Examiner* — Marc C Howell (57) ABSTRACT

A drink mixer apparatus for easily mixing beverages includes a handle having a handle proximal end, a handle distal end, a handle left side, a handle right side, a handle top side, and a handle bottom side. A battery is coupled within the handle. A motor is coupled within the handle and is in operational communication with the battery. A trigger is coupled to the handle and is in operational communication with the motor. An extension arm is coupled to the handle. The extension arm is coupled to the handle distal end and bends to form an angle between 45°-90°. A mixer shaft is rotatably coupled to the extension arm. A drive line is coupled to the motor and extends through the extension to be in operational communication with the mixer shaft. A mixer paddle is coupled to the mixer shaft.

10 Claims, 7 Drawing Sheets

DRINK MIXER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to drink mixing devices and more particularly pertains to a new drink mixing device for easily mixing beverages. The present device includes a handle, a curved shank, and a splash shield to mix beverages in their own containers.

(2) Description of Related Art Including Information Disclosed Under 37 CFR 1.97 and 1.98

The prior art relates to drink mixing devices. Most existing devices are integrated into the lid of a container either for beverage preparation or transport. Known devices designed to mix beverages within a separate container lack a temporary lid or splash shield to prevent spillage. Such devices also typically employ a straight shaft and require the user to hold his or her hand vertically above the beverage.

BRIEF SUMMARY OF THE INVENTION

An embodiment of the disclosure meets the needs presented above by generally comprising a handle having a handle proximal end, a handle distal end, a handle left side, a handle right side, a handle top side, and a handle bottom side. A battery is coupled within the handle. A motor is coupled within the handle and is in operational communication with the battery. A trigger is coupled to the handle and is in operational communication with the motor. An extension arm is coupled to the handle. The extension arm is coupled to the handle distal end and bends to form an angle between 45°-90°. A mixer shaft is rotatably coupled to the extension arm. A drive line is coupled to the motor and extends through the extension to be in operational communication with the mixer shaft. A mixer paddle is coupled to the mixer shaft.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 6 thereof, a new drink mixing device embodying the principles and concepts of an embodiment of the disclosure and generally designated by the reference numeral 10 will be described.

As best illustrated in FIGS. 1 through 6, the drink mixer apparatus 10 generally comprises a handle 12 having a handle proximal end 14, a handle distal end 16, a handle left side 18, a handle right side 20, a handle top side 22, and a handle bottom side 24. The handle bottom side 24 may have a plurality of ergonomic ridges 26 for user comfort and to prevent slippage. The handle 12 may taper thinner from the handle proximal end 14 to the handle distal end 16 for improved ergonomics. The handle top side 22 may have a selectively removable battery cover 28.

A battery 30 is coupled within the handle 12. The battery 30 may be coupled adjacent the battery cover 28 for ease of replacement. A motor 32 is coupled within the handle 12. The motor 32 is in operational communication with the battery 30. A trigger 34 is coupled to the handle 12. The trigger 34 may be coupled to the handle bottom side 24 between the plurality of ergonomic ridges 26 and the handle distal end 16 to allow for intuitive activation while securing the handle 12. The trigger 34 is in operational communication with the motor 32.

An extension arm 36 is coupled to the handle 12. The extension arm 36 is coupled to the handle distal end 16 and bends to form an angle between 45°-90°. The bend of the extension arm 36 allows the user to hold his or her arm and hand in a comfortable and natural position during use. The extension arm 36 may have a flanged arm distal end 38.

A mixer shaft 40 is rotatably coupled to the extension arm 36. A drive line 42 is coupled to the motor 32. The drive line 42 extends through the extension arm 36 to be in operational communication with the mixer shaft 40. The motor 32 thus spins the mixer shaft 40. The trigger 34 may allow for incremental speed activation of the motor 32 correlating with the depth the trigger 34 is depressed within the handle 12 in order to allow for variable speed mixing. A mixer paddle 43 is coupled to the mixer shaft 40. The mixer paddle 43 may be helical and may extend from proximal a shaft distal end 44 of the mixer shaft around a shaft sidewall 45 of the mixer shaft.

Figure 1:
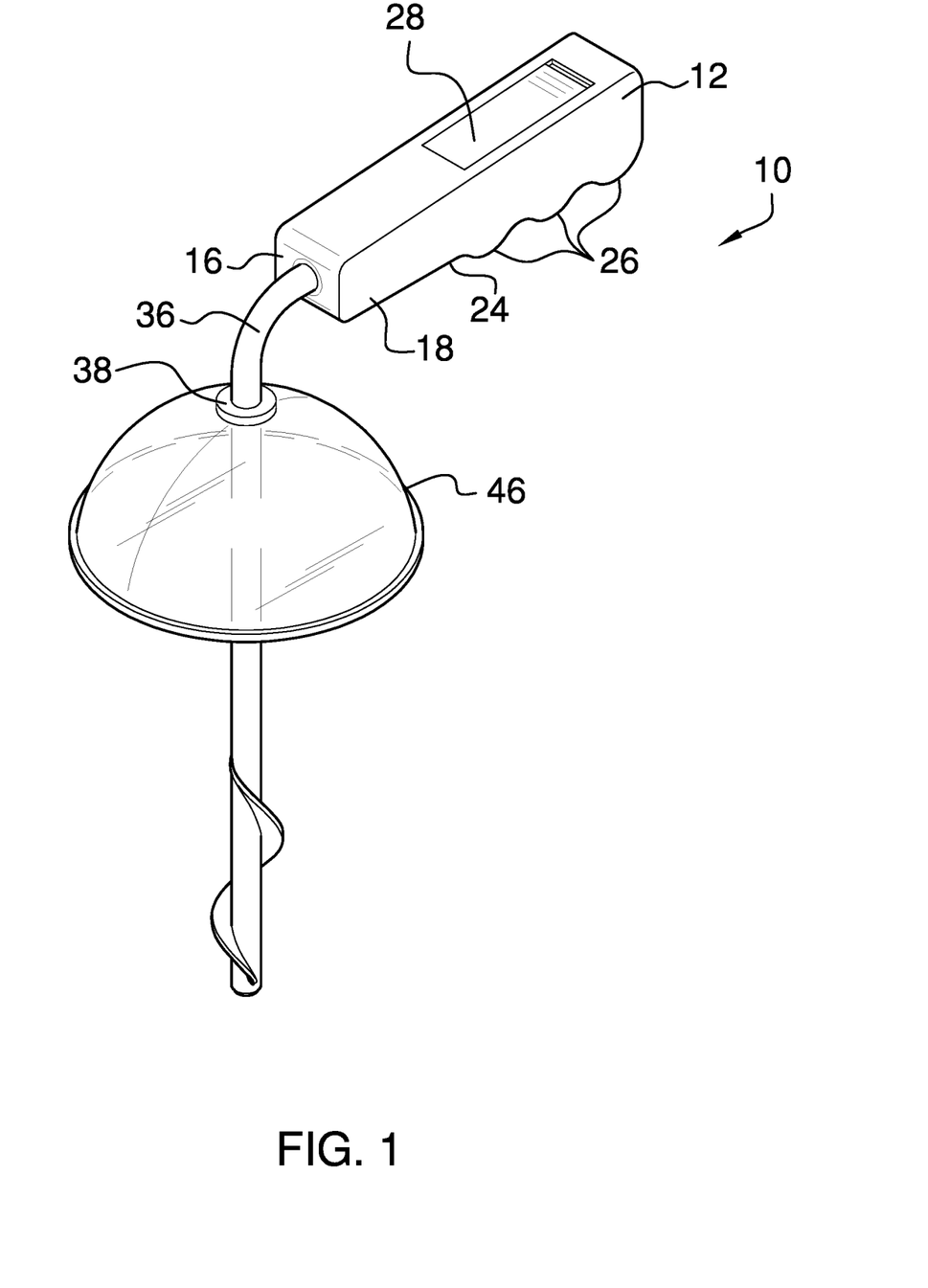
FIG. 1 is an isometric view of a drink mixer apparatus according to an embodiment of the disclosure.
Figure 2:
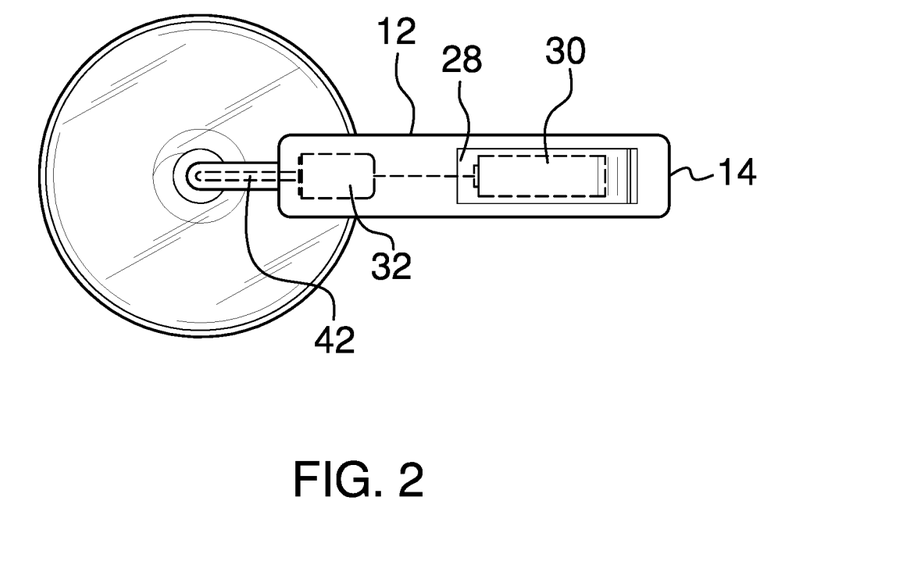
FIG. 2 is a top plan view of an embodiment of the disclosure.
Figure 3:
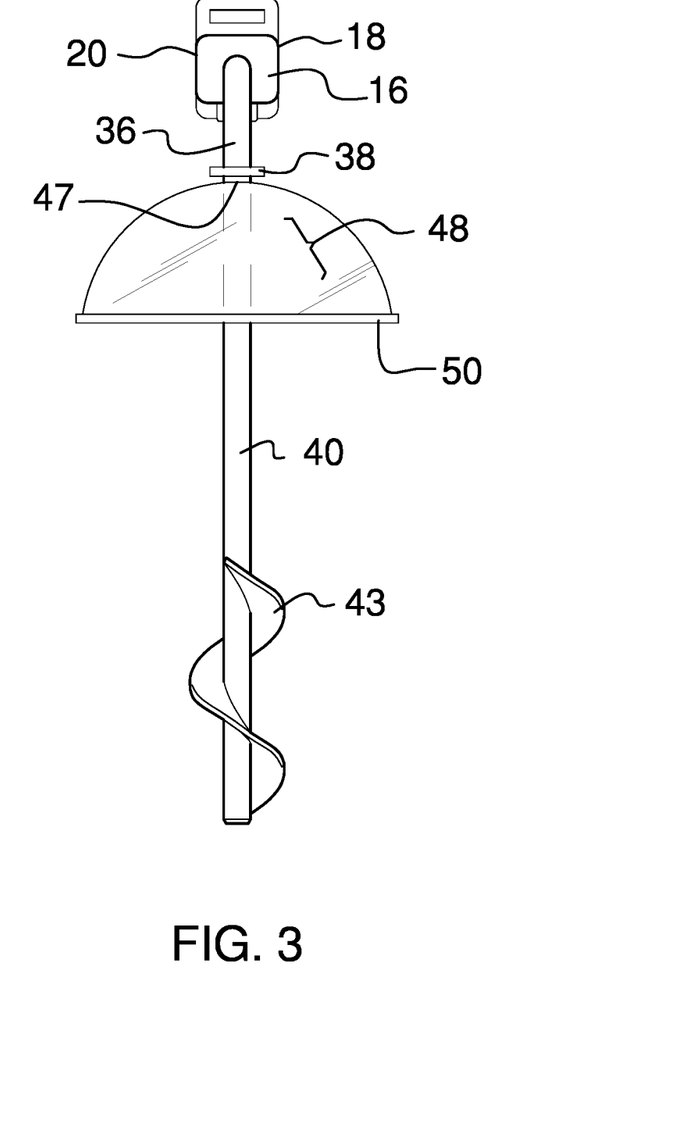
FIG. 3 is a front elevation view of an embodiment of the disclosure.
Figure 4:
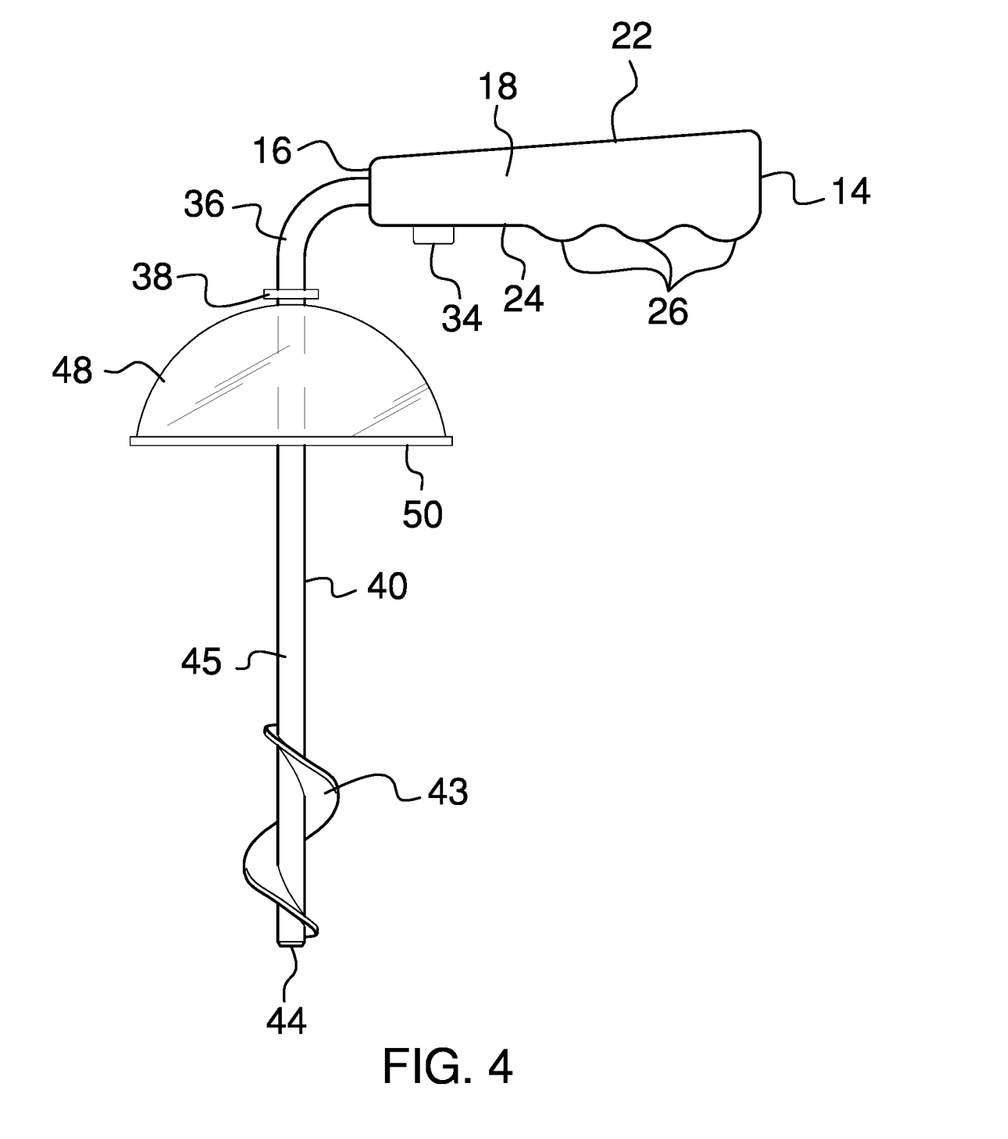
FIG. 4 is a side elevation view of an embodiment of the disclosure.
Figure 5:
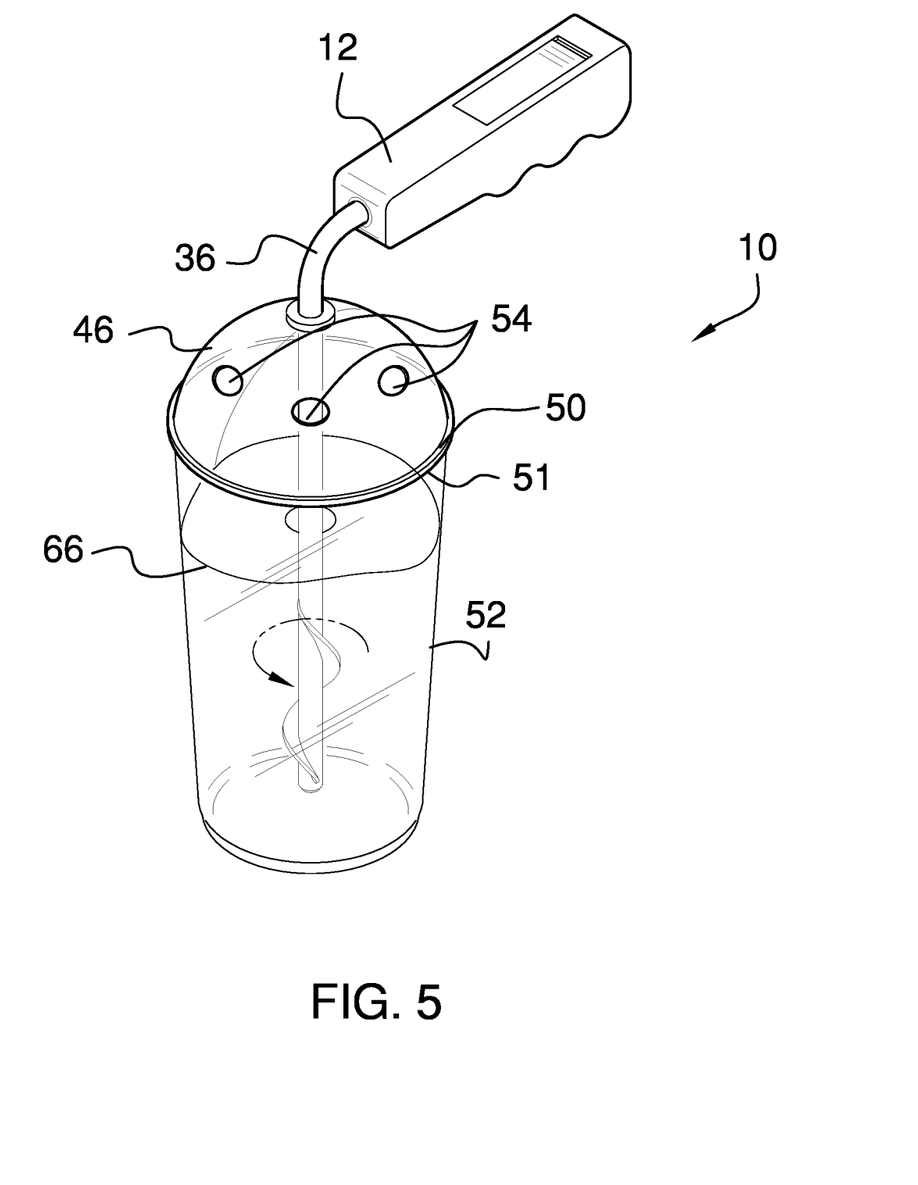
FIG. 5 is an in-use view of an embodiment of the disclosure.
Figure 6:
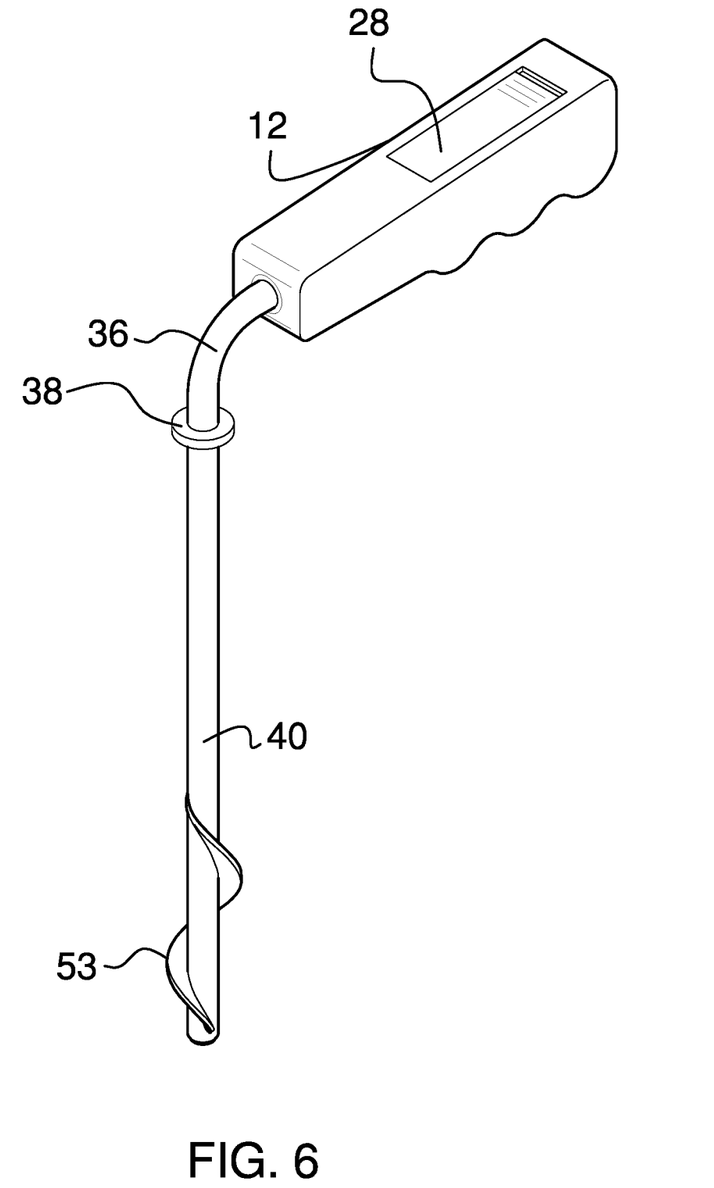
FIG. 6 is an isometric view of an embodiment of the disclosure.

A splash cover 46 is coupled to the mixer shaft 40. The splash cover 46 has an engagement aperture 47 to selectively receive the mixer shaft 40. The splash cover 46 may be removed as seen in FIG. 6 by disengaging the mixer shaft 40 from the extension arm 36. The splash cover 46 may include a hemispherical cover wall 48 and a cover perimeter 50. The cover perimeter 50 is configured to selectively engage a rim 51 of a beverage cup 52. The cover wall 48 may be transparent to allow visibility of the mixing in progress. The cover wall 48 may also have a plurality of vent apertures 54 extending therethrough for hot beverages to release steam. The plurality of vent apertures 54 may be evenly radially spaced around the engagement aperture 487

Figure 7:
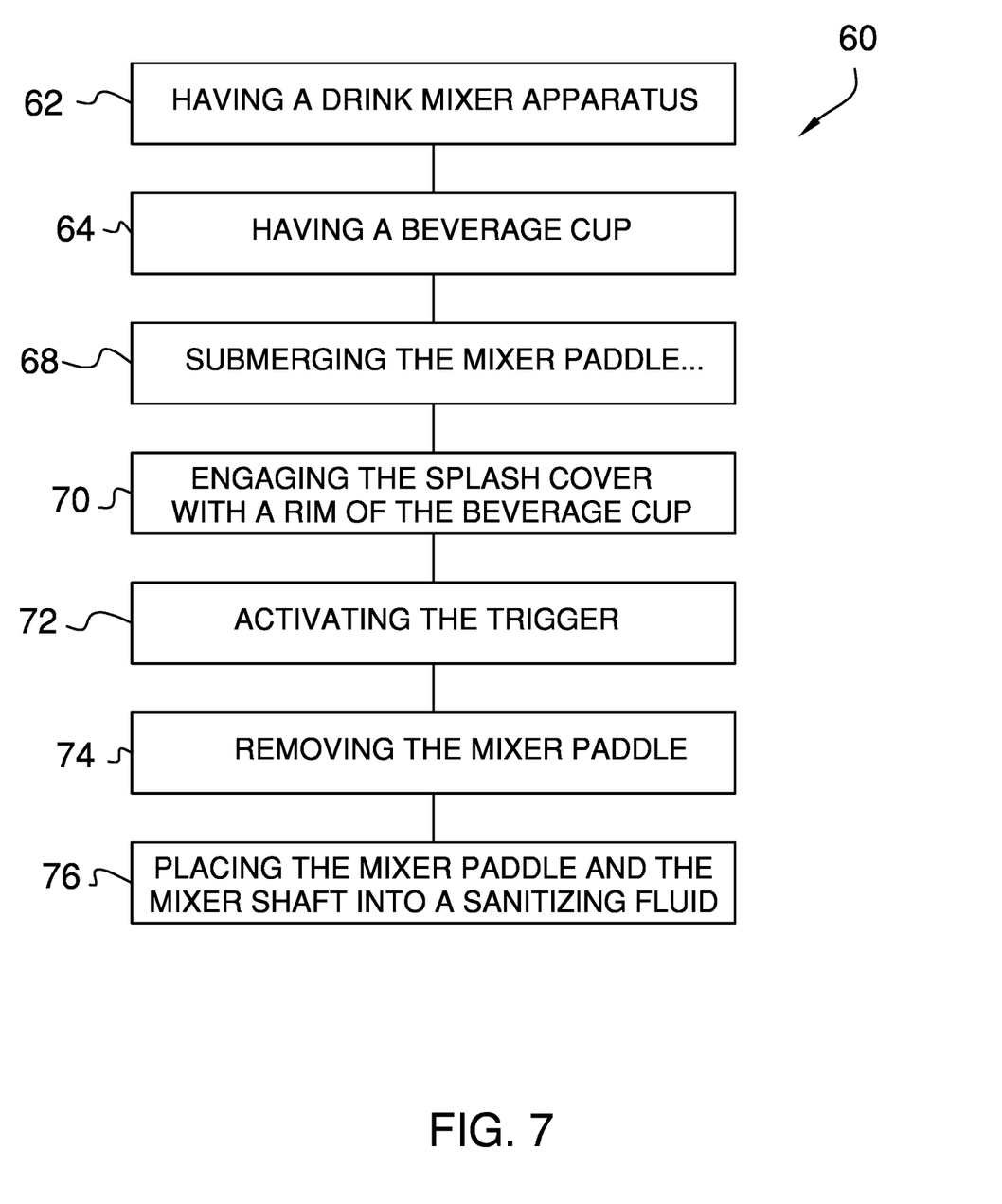
FIG. 7 is a block diagram of a method of use of an embodiment of the disclosure.

In use, the drink mixer apparatus 10 allows for a method of use 60 comprising a step 62 having a drink mixer apparatus 10. A step 64 comprises having the beverage cup 52 filled with a beverage 66. A step 68 comprises submerging the mixer paddle 43 within the beverage 66 of the beverage cup. A step 70 comprises engaging the splash cover 46 with the rim 51 of the beverage cup. A step 72 comprises activating the trigger 34 to spin the mixer paddle 43 until the beverage 66 has been thoroughly mixed. A step 74 comprises removing the mixer paddle 43 from the beverage. A step 76 comprises placing the mixer paddle 43 and the mixer shaft 40 into a sanitizing fluid.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A drink mixer apparatus comprising:
   a handle, the handle having a handle proximal end, a handle distal end, a handle left side, a handle right side, a handle top side, and a handle bottom side;
   a battery coupled within the handle;
   a motor coupled within the handle, the motor being in operational communication with the battery;
   a trigger coupled to the handle, the trigger being in operational communication with the motor;
   an extension arm coupled to the handle, the extension arm being coupled to the handle distal end and bending to form an angle between 45°-90°;
   a mixer shaft rotatably coupled to the extension arm;
   a drive line coupled to the motor, the drive line extending through the extension arm and being in operational communication with the mixer shaft;
   a mixer paddle coupled to the mixer shaft, the mixer paddle being helical and extending from proximal a shaft distal end of the mixer shaft around a shaft sidewall of the mixer shaft; and
   a splash cover coupled to the mixer shaft, the splash cover having an engagement aperture selectively receiving the mixer shaft, a hemispherical cover wall, and a cover perimeter, the cover perimeter being configured to selectively engage a rim of a beverage cup.

2. The drink mixer apparatus of claim 1 further comprising the extension arm forming a curved angle of 90°.

3. The drink mixer apparatus of claim 1 further comprising the extension arm having a flanged arm distal end.

4. The drink mixer apparatus of claim 1 further comprising the cover wall being transparent.

5. The drink mixer apparatus of claim 1 further comprising the cover wall having a plurality of vent apertures extending therethrough.

6. The drink mixer apparatus of claim 1 further comprising the handle bottom side having a plurality of ergonomic ridges.

7. The drink mixer apparatus of claim 1 further comprising the trigger being coupled to the handle bottom side between the plurality of ergonomic ridges and the handle distal end.

8. The drink mixer apparatus of claim 1 further comprising the handle top side having a selectively removable battery cover; the battery being coupled adjacent the battery cover.

9. A drink mixer apparatus comprising:
   a handle, the handle having a handle proximal end, a handle distal end, a handle left side, a handle right side, a handle top side, and a handle bottom side, the handle bottom side having a plurality of ergonomic ridges, the handle top side having a selectively removable battery cover;
   a battery coupled within the handle, the battery being coupled adjacent the battery cover;
   a motor coupled within the handle, the motor being in operational communication with the battery;
   a trigger coupled to the handle, the trigger being coupled to the handle bottom side between the plurality of ergonomic ridges and the handle distal end, the trigger being in operational communication with the motor;
   an extension arm coupled to the handle, the extension arm being coupled to the handle distal end and bending to form an angle between 45°-90°, the extension arm having a flanged arm distal end;

a mixer shaft rotatably coupled to the extension arm;

a drive line coupled to the motor, the drive line extending through the extension arm and being in operational communication with the mixer shaft;

a mixer paddle coupled to the mixer shaft, the mixer paddle being helical and extending from proximal a shaft distal end of the mixer shaft around a shah sidewall of the mixer shaft; and a splash cover coupled to the mixer shaft, the splash cover having an engagement aperture selectively receiving the mixer shah, a hemispherical cover wall, and a cover perimeter, the cover perimeter being configured to selectively engage a rim of a beverage cup, the cover wall being transparent and having a plurality of vent apertures extending therethrough.

10. A method of using the drink mixer apparatus comprising:

having a drink mixer apparatus comprising:

a handle, the handle having a handle proximal end, a handle distal end, a handle left side, a handle right side, a handle top side, and a handle bottom side, the handle bottom side having a plurality of ergonomic ridges, the handle top side having a selectively removable battery cover;

a battery coupled within the handle, the battery being coupled adjacent the battery cover;

a motor coupled within the handle, the motor being in operational communication with the battery;

a trigger coupled to the handle, the trigger being coupled to the handle bottom side between the plurality of ergonomic ridges and the handle distal end, the trigger being in operational communication with the motor;

an extension arm coupled to the handle, the extension arm being coupled to the handle distal end and bending to form an angle between 45°-90°, the extension arm having a flanged arm, distal end;

a mixer shaft rotatably coupled to the extension arm;

a drive line coupled to the motor, the drive line extending through the extension arm and being in operational communication with the mixer shaft;

a mixer paddle coupled to the mixer shaft, the mixer paddle being helical and extending from proximal a shaft distal end of the mixer shaft around a shaft sidewall of the mixer shaft; and a splash cover coupled to the mixer shaft, the splash cover having an engagement, aperture selectively receiving the mixer shaft, a hemispherical cover wall, and a cover perimeter;

having a beverage cup filled with a beverage;

submerging the mixer paddle within the beverage of the beverage cup;

engaging the splash cover with a rim of the beverage cup;

activating the trigger to spin the mixer paddle until the beverage has been thoroughly mixed;

removing the mixer paddle from the beverage; and placing the mixer paddle and the mixer shaft into a sanitizing fluid.

\* \* \* \* \*